(12) United States Patent
Savage et al.

(10) Patent No.: US 6,378,420 B1
(45) Date of Patent: Apr. 30, 2002

(54) FILTER SYSTEM FOR A DEEP FAT FRYER

(75) Inventors: Steven J. Savage, Concord; Nathaniel A. Lambert, Hooksett; Martin W. Lawrence, Chichester; Robert L. Brown, Merrimack, all of NH (US)

(73) Assignee: Pitco Frialator, Inc., Concord, NH (US)

(*) Notice: Subject to any disclaimer, the term of this patent is extended or adjusted under 35 U.S.C. 154(b) by 0 days.

(21) Appl. No.: 09/821,801

(22) Filed: Mar. 30, 2001

(51) Int. Cl.[7] ............................. A47J 37/00; A47J 37/12
(52) U.S. Cl. ............................. 99/408; 99/330; 99/403; 210/167; 210/DIG. 8
(58) Field of Search ........................... 99/330, 331, 336, 99/403–410, 411, 412; 210/167, DIG. 8, 241, 247, 257.1, 258, 473, 791, 805, 196, 197, 411, 416.1, 424, 428; 426/438, 523

(56) References Cited

U.S. PATENT DOCUMENTS

| | | | | |
|---|---|---|---|---|
| 3,646,882 A | * | 3/1972 | Keating | 99/408 |
| 3,667,374 A | * | 6/1972 | Homes | 99/411 X |
| 3,685,433 A | * | 8/1972 | Cunningham | 99/408 |
| 3,933,645 A | * | 1/1976 | Keramidas | 210/305 |
| 3,937,136 A | * | 2/1976 | Cox | 99/408 |
| 3,968,741 A | * | 7/1976 | Hunt | 99/330 |
| 3,977,973 A | | 8/1976 | Anderson | |
| 4,068,571 A | * | 1/1978 | Cunningham | 210/DIG. 8 |
| 4,084,492 A | * | 4/1978 | Sullivan | 99/330 X |
| 4,487,691 A | * | 12/1984 | Panora | 210/167 |
| 4,489,646 A | * | 12/1984 | Schmidt et al. | 426/438 |
| 4,623,544 A | | 11/1986 | Highnote | |
| 4,684,412 A | * | 8/1987 | Fritzsche | 210/DIG. 8 |
| 4,768,426 A | | 9/1988 | Nett | |
| 4,962,698 A | | 10/1990 | Drijftholt et al. | |
| 5,228,985 A | * | 7/1993 | Wells et al. | 210/167 |
| 5,404,799 A | | 4/1995 | Bivens | |
| 5,452,648 A | * | 9/1995 | Hohler et al. | 99/408 |

\* cited by examiner

*Primary Examiner*—Timothy F. Simone
(74) *Attorney, Agent, or Firm*—Donald C. Casey, Esq.

(57) ABSTRACT

A filter system for a deep fat fryer is described. The filter system can be used in a single fryer or with two or more sequentially operated fryers. In the later case, a common filter pan is used with a horizontal filter in the pan, disposed below a common drain pipe. A return pipe is mounted in the center of the filter. This pipe is connected to a pump inlet so that oil to be filtered is admitted to the pan above the filter, and filtered oil is removed from the pan through the filter. Filtered oil is then circulated by the pump through a three port valve to return the oil to the appropriate fryer tank. If the valve is closed the oil will be routed through the valve to an adjacent tank valve for admission to that tank so that a single pump may be used for a plurality of tanks. An optional flush system can also be provided so that oil can be used to flush a tank manually.

17 Claims, 8 Drawing Sheets

FILTER SYSTEM FOR A DEEP FAT FRYER

FIELD OF THE INVENTION

This invention relates to a filter system for a commercial deep fat fryer which permits recycling and filtering of the cooking oil with only a minimum of involvement by an operator. The filter system may also interconnect adjacent units whereby a single filter can be used sequentially to filter oil from multiple units.

DESCRIPTION OF THE PRIOR ART

Commercial deep fat frying units are used in restaurants to cook a wide variety of foods, including, for example, french fried potatoes, chicken and fish, and are used with batter coated foods in many instances.

Food items to be cooked are placed in a mesh basket and immersed in the hot cooking oil. As the oil circulates through the basket, cooked food particles become dislodged and drop out of the basket into the oil bath. It is necessary to filter the oil from time to time, and the rapidity with which such a filtering operation can be carried out is very important in a commercial fast food restaurant. It is preferred, then, to recycle the oil through a filter as quickly as possible.

In some prior art deep fat fryers, a sump is provided below heat tubes which extend through the oil bath. Food is cooked above the heat tubes and dislodged particles accumulate in the sump. The sump area below the heat tubes is at a lower temperature than the cooking bath and disagreeable flavors can develop from the over cooked food particles in the sump. Furthermore, if the sump is drained, filtered, and returned to the cooking bath it will be at a lower temperature than that required for cooking, necessitating reheating the oil before the cooking procedure can be repeated. In some instances, a separate heater is provided for the filtered oil before it is returned to the bath.

In U.S. Pat. No. 4,623,544 a weir is provided at the surface of the cooking bath and oil is continually allowed to flow over the weir and downward into a sump. The oil entering the sump is filtered, reheated, and continually re-injected into the oil bath. This can be heat inefficient because of the exposed piping to and from the heat exchanger.

In U.S. Pat. No. 3,977,973 a heat tube is provided in the lower portion of the bath and oil is withdrawn from the lower portion of the bath. The withdrawn oil flows through filters and is then re-injected into the bath adjacent the heat tubes. This device is capable of filtering on a continuous basis. The food particles, however, must first settle through the bath before they can be drained because oil is withdrawn from the lower portion of the bath only. This requires time, which can allow the food particles to transmit undesirable flavors into the cooking bath.

U.S. Pat. No. 5,404,799 describes a filter mechanism placed at the bottom of the tank containing the oil bath so that oil is continuously removed from the oil bath through the filter. Other related oil filtering systems are shown, for example, in U.S. Pat. No. 4,768,426 and is 4,962,698.

In co-pending patent application, Ser. No. 08/724,233, assigned to the assignee of this invention, there is described a continuous filtering system which includes a sump which is disposed beside the fryer tank so that oil from the surface of the tank will continuously spill over the edge of the tank into the sump whereupon it is recycled. This adds to the horizontal dimensions of the fryer in that the sump is disposed beside the fryer tank instead of below it. Dimensional requirements in fast food restaurants are very stringent. Typically, an oversized kitchen unit, whether it is a fryer or an oven, can not be used to replace a conventional unit, because there will not be sufficient space to accommodate the unit.

In co-pending application Ser. No. 09/390,284, a deep fat fryer is described wherein heat tubes extend through the tank and a filter system is provided below the tank. In such a filter system, it is desirable to remove the oil from the tank by gravity from the bottom of the tank and allow the oil to flow into a separate filter sump below the tank. The filtered oil is then pumped from the filter sump back into the tank. When it is desirable to change oil the separate filter sump can be removed and the used oil pumped therefrom into a waste container for disposal. There is a need, however, for an efficient means for achieving these functions in a filter system for one or more deep fat fryers which can be disposed below the fryer tank.

SUMMARY OF THE INVENTION

It has been discovered that a simplified and efficient filter system can be provided for commercial deep fat fryers wherein the system includes a filter sump, which is in the form of a pan slidably disposed below the fryer tank with wheels mounted thereon so that when it is desired to clean the tank or remove the used oil therefrom for disposal, the filter pan can be slidably displaced outwardly from the fryer unit for access. In addition, in a preferred embodiment of this invention a plurality of adjacent fryers could be serviced by a single filter pan with sequential filtering of the oil from each fryer unit.

In order to achieve sequential operation hand controls are provided in the front of each fryer and, typically, there are only two such controls. One control lever would open the tank valve so that the used oil can flow downwardly by gravity into the filter pan. The second control lever would activate or deactivate the return, by opening or closing a valve system, and tuning a pump on or off, simultaneously.

In operation, the oil will flow downwardly into a filter, pass through the filter, and then be pumped from the bottom of the pan through the filter so that the food particles will be left on top of the filter which is horizontally disposed in the filter pan. Cleaning is then simplified by lifting the filter out of the pan to dump the food particles into a waste container.

There are several improved features of the instant invention which dramatically increase the simplicity and efficiency of the filter system. There is a filter pickup tube which connects the filter and the pump to return filtered oil to the fryer. When it is necessary to clean the filter it is necessary to disconnect this tube. The tube however need not be removed from the fryer system because it is on a swivel attachment thereto. When it desired to clean the filter the end of the tube attached to the filter is freed and the entire tube is merely swiveled aside so that the filter can be lifted from its tank. In addition, the free end of the tube is attached to the filter by a seal engagement which remains intact even when there is debris residing in the filter pan and the filter is placed on top of it. The filter can be elevated while properly maintaining a seal. In this way, as debris builds in the filter pan the filter can rise up in a floating arrangement, as will be subsequently explained.

The filter itself includes a metal frame with upwardly extending handles so that the entire filter assembly, including the frame, can be removed quickly from the filter pan. Preferably the pickup tube is coupled to the metal frame by a rotatable coupling having a grip extension so that it can loosened quickly by hand.

The filter pan itself is slidably received in the fryer housing on opposed guide rails. Preferably the openings into the guide rails are tapered so that an operator can easily return the pan to its tracks after cleaning. The fryer of this invention further has a filter lid mounted on the fryer chassis or housing rather than on the filter pan and extending between the filter pan guide rails. Preferably the filter pan has integral sides which are contoured and casters are mounted on the lower surface at the distal end. The proximal end of the lower surface preferably has front skid feet, a handle, and a bull nose radius to allow the pan to roll over, for example, a rubber slip resistant safety mat normally located in the front of the fryer when the filter pan is removed. The combination of casters and the front handle on the filter pan allows the operator to move the pan on its rear casters in a fashion similar that used to move a suitcase on casters.

Furthermore, when the debris laden oil is transmitted from the fryer to the filter pan its passes through a downspout which is curved to allow the oil to spill across the filter pan at an acute angle rather than a perpendicular flow. The angled entry reduces the likelihood of splashing. The downspout is also swiveled and is movable between an open and a closed position. When the filter pan is pushed or pulled along its tracks it force the downspout to swivel between a substantially vertical position and a substantially horizontal position, with the latter being a closed position. This swiveled feature requires close tolerance in machine parts and O-rings to supply the necessary friction so that the spout will remain in place in its last position without free play.

Furthermore, a fixed axis universal joint is provided whereby precise alignment of the drain line can be provided regardless of dimensional variations introduced by adjacent or mating parts. The drain line itself may serve multiple fryers allowing a single filter pan for more than one fryers. In this instance the drain line should be of increasing diameter as it approaches the filter pan.

A unique three port valve is provided between the pump and the fryer tank so that when a single filter is used with multiple fryers the oil can be filtered sequentially and returned to the individual fryer by merely manipulating the valve on the return line. This feature permits reduction of the number of pipe joints and permits the adding of multiple fryers to a single pan. It will be necessary when operating the pump to provide for an anti-hammer effect in the return line by adding line compresses to reduce the overall system pressure.

Finally, the fryer of this invention is designed to provide the filter pan as optional rather than as a required unit so that if a customer desires to add a filter pan in the field this can be accomplished without providing a different cabinet. The cabinet or chassis maintains the same envelope with or without the filter pan.

Accordingly, it is an object of this invention to provide an efficient filtering system for one or more commercial deep fat fryers.

It is another object of this invention to provide a filter pan which is disposed below one or more fryers, and which may be slidably mounted in the lower portion of the fryer units and provided with wheels so that it can be easily moved from below the fryer units for access.

It is another object of this invention to provide a filter system in which a filter pan is disposed below the fryer tank with a horizontal filter therein consisting of paper, cloth, or other filter media supported on a horizontal frame so that oil from the tank drains down onto the filter, and passes through the filter, leaving cooked food particles on the outer surface of the filter.

It is a further object of this invention to provide a single filter pan for one or more adjacent units and a single pump with a three port valve so that when oil is drained from a single tank into the filter it can be returned to that same cooking tank whereby adjacent units can be sequentially filtered.

These and other objects will become readily apparent with reference to the drawings and the following description wherein:

DETAILED DESCRIPTION OF THE INVENTION

Figure 1:
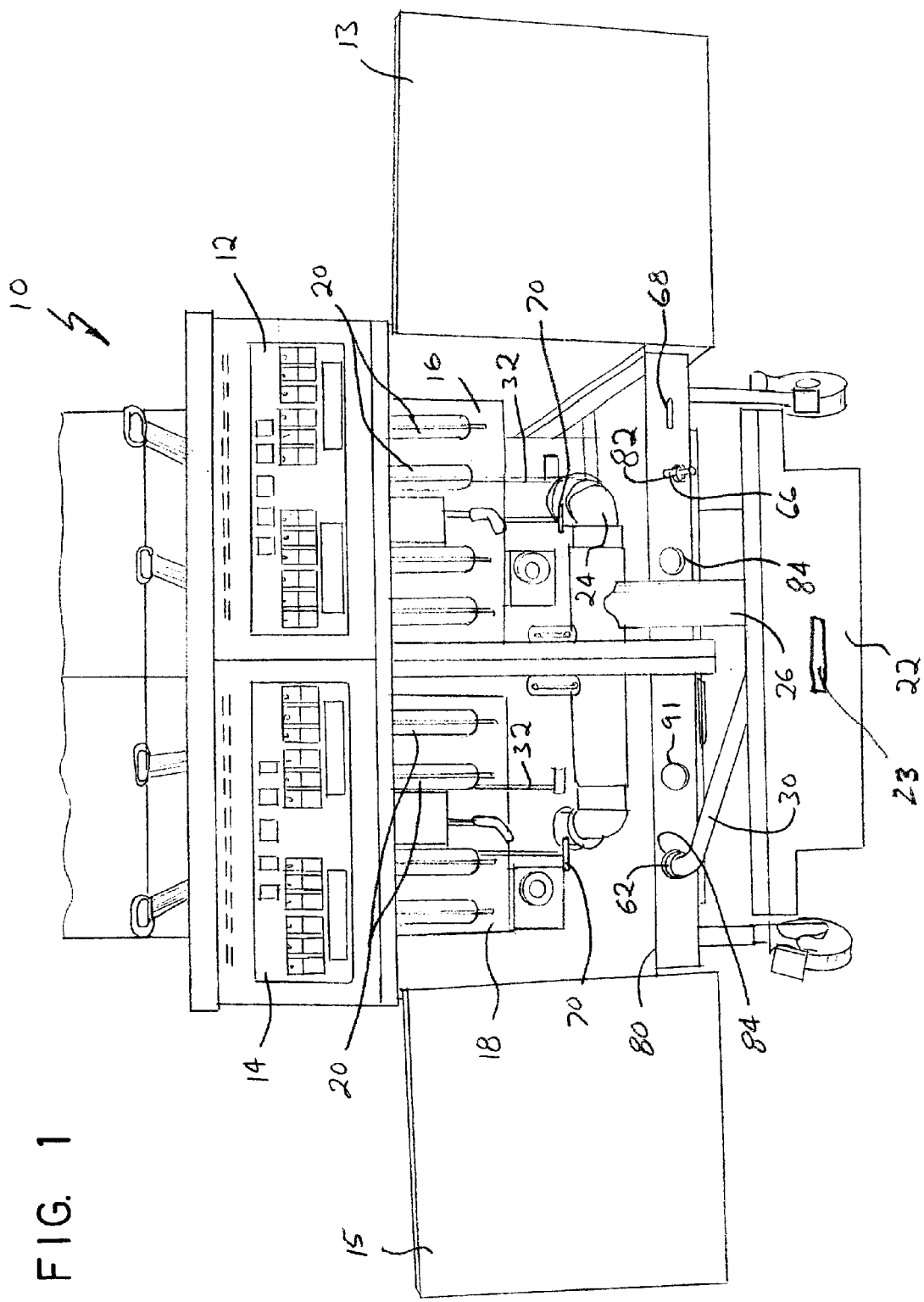
FIG. 1 is a front view of a pair of deep fat fryers using the single filter system of this invention with the access doors open.

With attention to FIG. 1, there is shown a pair of deep fat fryer units 10 which have separate cooking controls 12 and 14, and separate cooking tanks, 16 and 18. Four burners 20 are shown for each tank 16 and 18.

As will be obvious to those skilled in the art, this invention can be used with a single cooking tank, or multiple tanks. The cooking tanks are also not limited to four burner tubes, but could be any number. The burner tubes, then, and the number of cooking units are not part of the instant invention. See U.S. patent application Ser. No. 09/533,597, filed Mar. 3, 2000, and assigned to the assignee of this invention, on the details of the burner housing and related features in the preferred embodiment. The disclosure of that application is hereby incorporated by reference.

The filter system of this invention includes a sump in the form of a pan 22 disposed below, as shown in FIG. 1, a pair of deep fat fryers 10. Oil from the tank is drained, as will be subsequently described, through the piping system 24 and through swivel outlet 26 and falls by gravity into pan 22. Return pipe 30 is used to return the oil to the tank, as will be subsequently described. Handle 32, as shown in FIG. 1, opens and closes the tank drain. Handle 32 can be accessed from the front of units 10 by opening doors 13 or 15.

Figure 2:
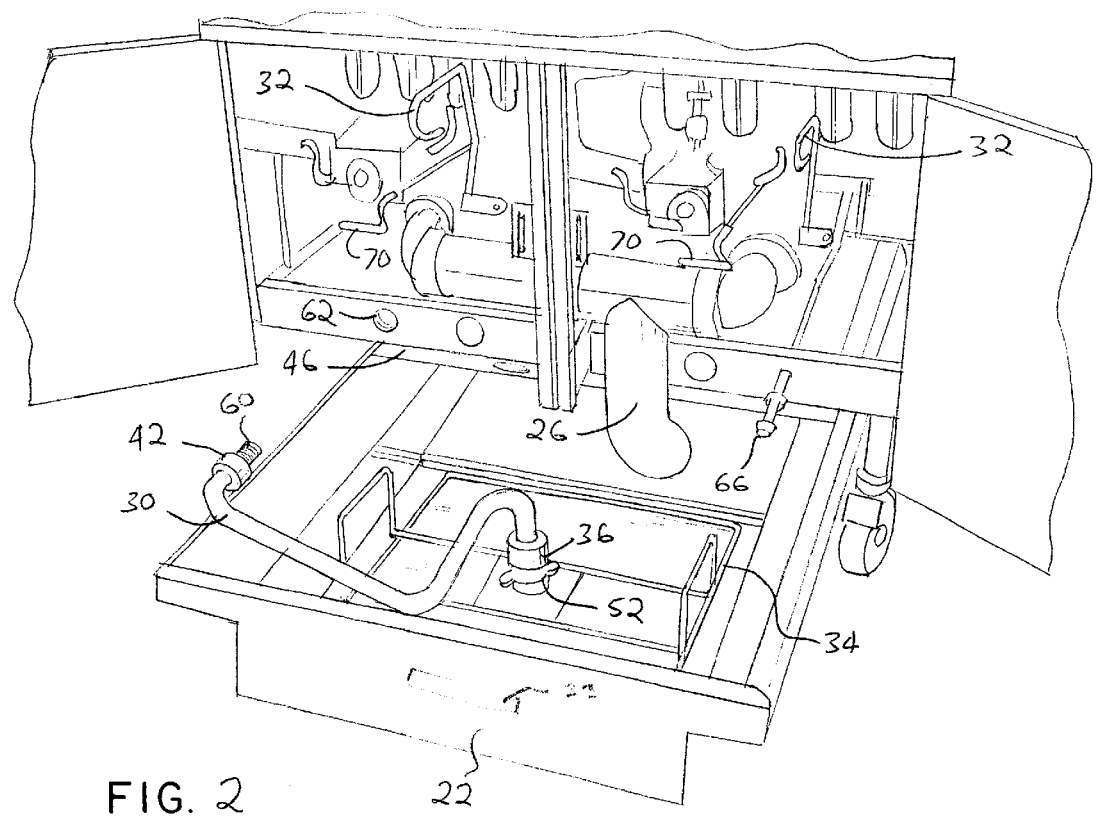
FIG. 2 is a fragmentary perspective view showing a portion of the filter system of this invention with the filter pan slidably displaced outwardly.
Figure 3:
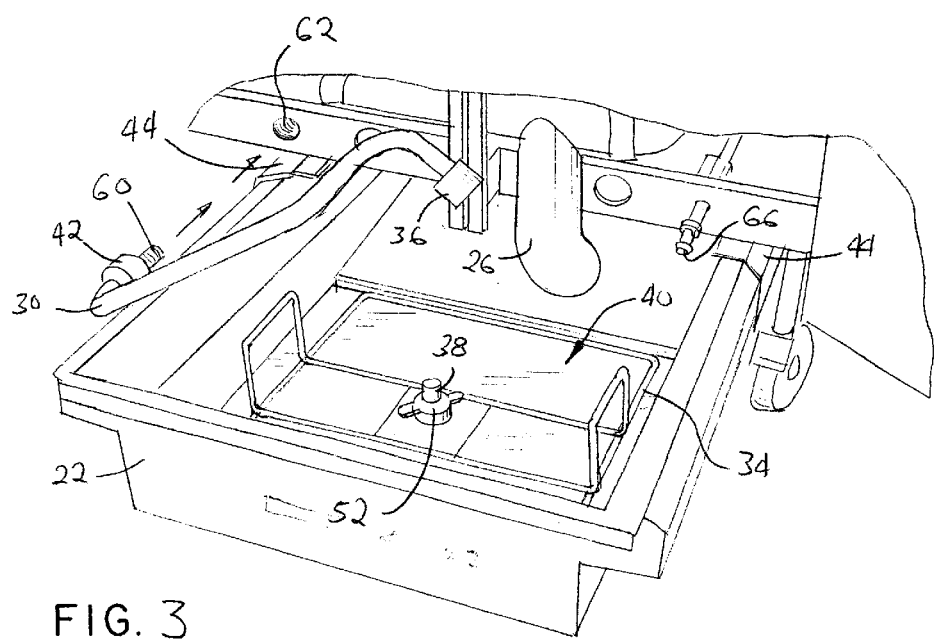
FIG. 3 is a fragmentary perspective view of the filter pan of this invention.

With attention to FIGS. 2 and 3, the filter carrying frame 34 is normally horizontal in filter pan 22 and the return pipe 30 is intended to be coupled at coupling 36 and to an outlet 38 communicating with the filtered oil through the filter 40. The opposite end of return pipe 30 is a swivel mount above a holder 42 and terminates at the male member 60 which engages the oil return system at the return pump inlet 62 as will be subsequently described. Oil return pipe 30 can be pivoted away from filter 40 or removed, as shown in FIG. 3, for cleaning and the like.

Downspout 26 is pivotally mounted and can be rotated upwardly if it is desired to remove the filter pan 22 from beneath the fryers 20. The filter pan 22 typically is mounted on tapered slides 44 and further includes a lid 46 which is retained by the slides 44 mounted on the fryer unit housing rather than being directly mounted on the pan 22.

Figure 4:
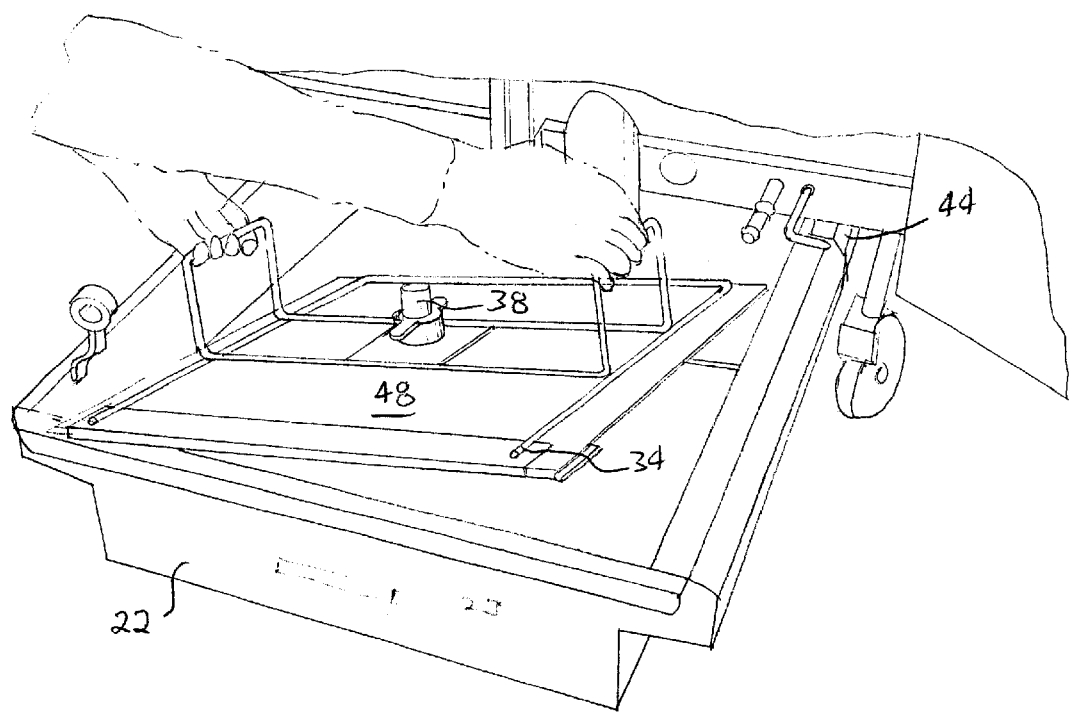
FIG. 4 is a fragmentary perspective view showing the filter of this invention being removed from the filter pan.
Figure 5:
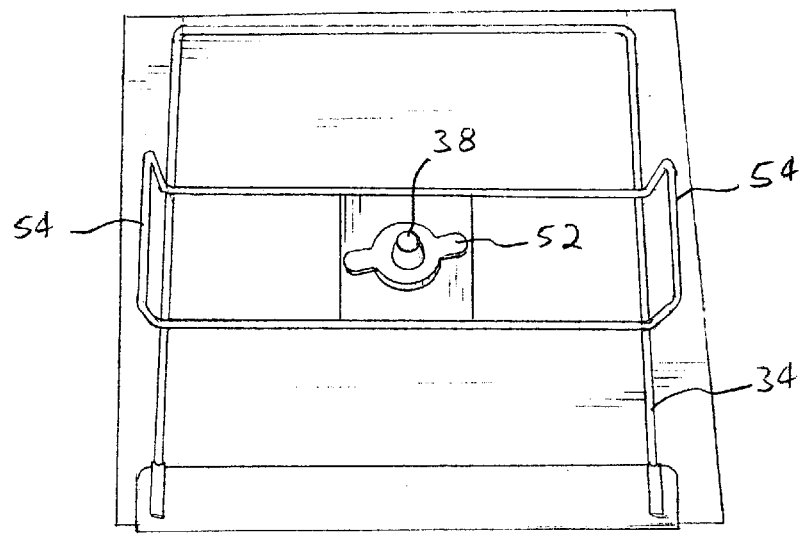
FIG. 5 is a perspective view of the filter of this invention.
Figure 6:
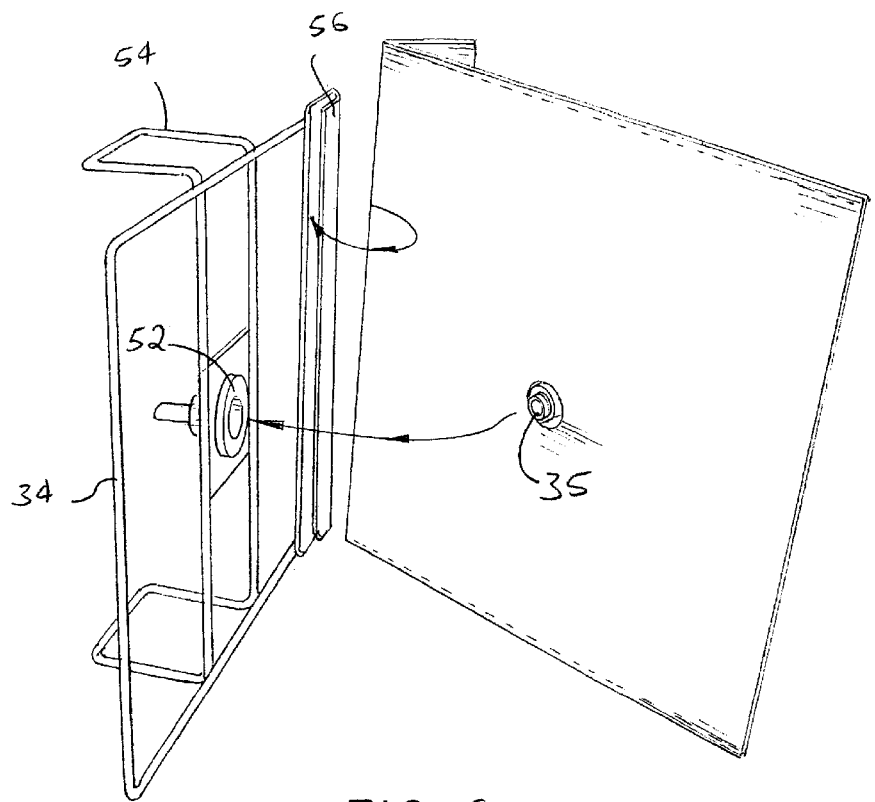
FIG. 6 is an exploded perspective view showing the filter of this invention removed from the filter frame.
Figure 7:
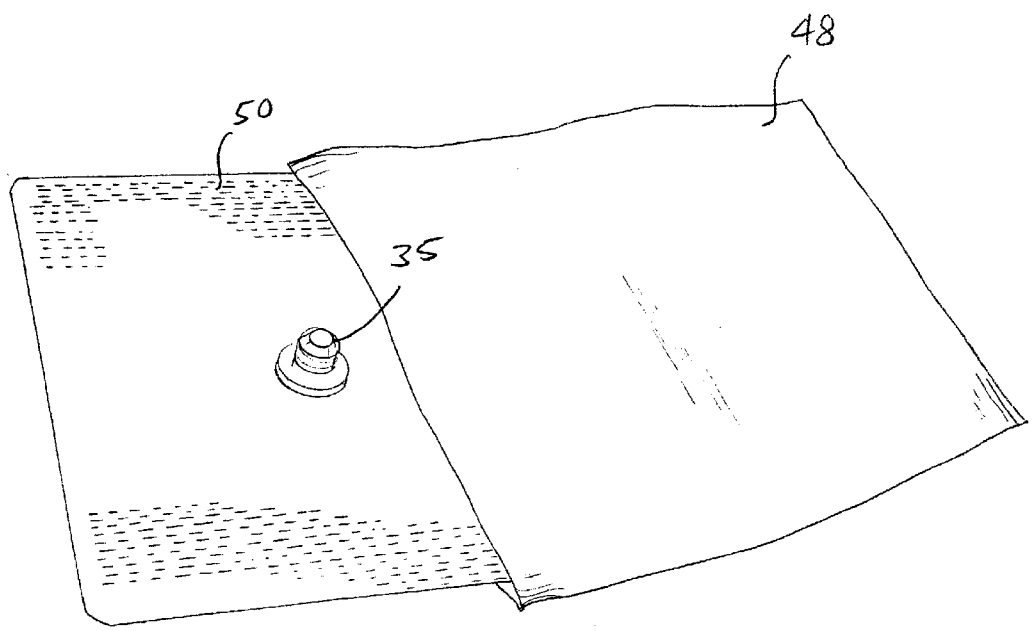
FIG. 7 is a perspective view of the filter of FIG. 6 with the filter element removed from its support.
Figure 8:
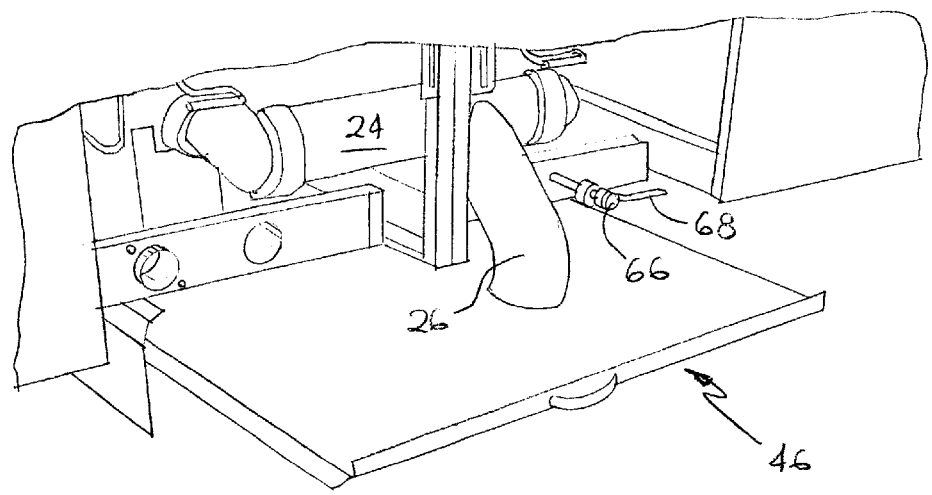
FIG. 8 is a perspective view of the unit of FIGS. 1–3 showing the filter pan removed and exposing its lid.

With attention to FIGS. 4–7, the filter 40 consists of an external frame 34, a filter medium 48, and an internal support 50. The filter medium 48 is a sleeve and the support 50 is porous. The outlet 38 is attached to frame 34 by a coupling 52 and handles 54 are provided on the frame. The filter medium and support are attached to the frame 34 at channel 56. As shown in FIG. 4, the filter frame 34 is intended to rest or float within pan 22, and the coupling 36 on return pipe 30 is intended to engage the upper portion of coupling 52 so that oil in pan 22 below filter 40 may be drawn upwardly by the action of the pump, as will be subsequently described. Filtered oil is withdrawn from within the sleeve 48 and the support 50.

The intake pipe 30 which communicates through port 38 with filtered oil, has an end 60 which normally engages the pump female coupling 62 through opening 91. The pump inlet communicates with pipe 30 so that it receives oil through the pipe 30 and returns oil to the tank 16 or 18.

Figure 11:
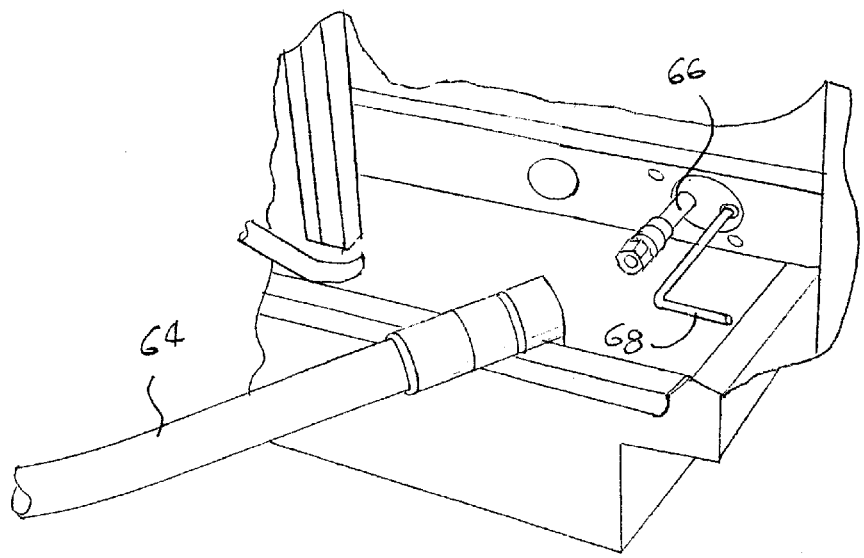
FIG. 11 is a fragmentary perspective view of on optional tank flush hose and control lever.

With attention to FIG. 11, if it is desired to flush the tank 16 or 18 a separate flush hose 64 can be used. When the hose 64 is engaged with outlet 66 and lever 68 is pulled, a valve (not shown) is opened and the pump turned on directing oil through the hose 64. The flush hose could be used to clean an empty tank or dispense oil.

Figure 9:
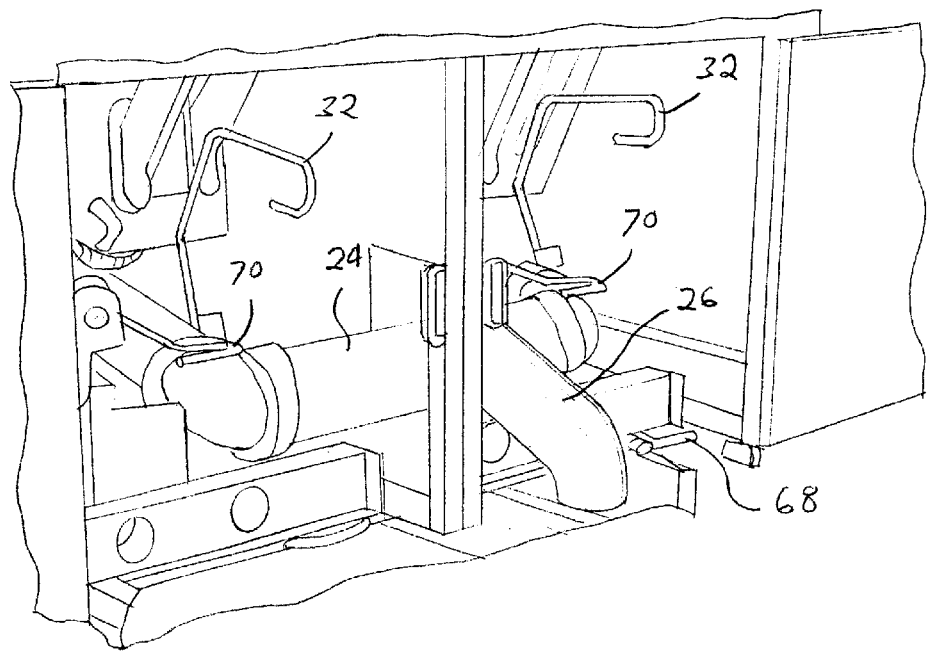
FIG. 9 is a fragmentary perspective view similar to FIG. 8 showing the oil removal piping.
Figure 10:
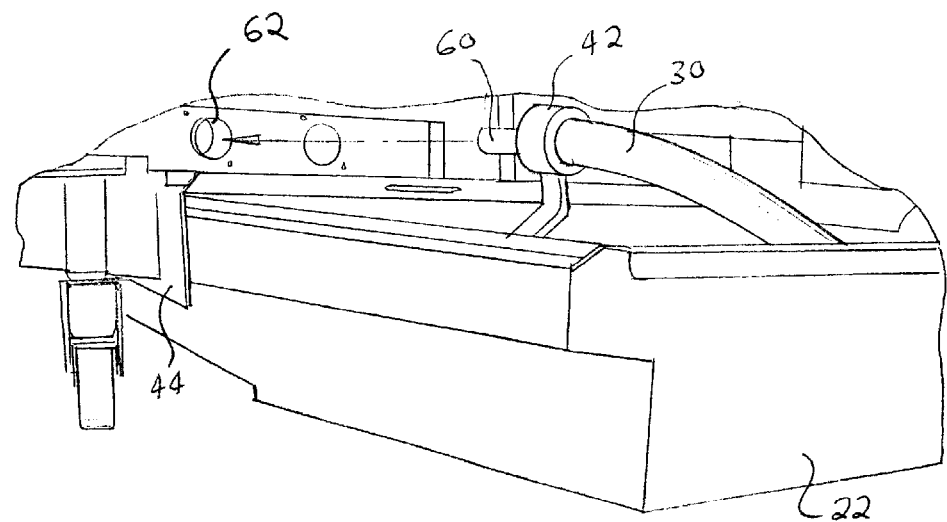
FIG. 10 is a fragmentary perspective view showing the pump connection of the oil return pipe from the filter.
Figure 12:
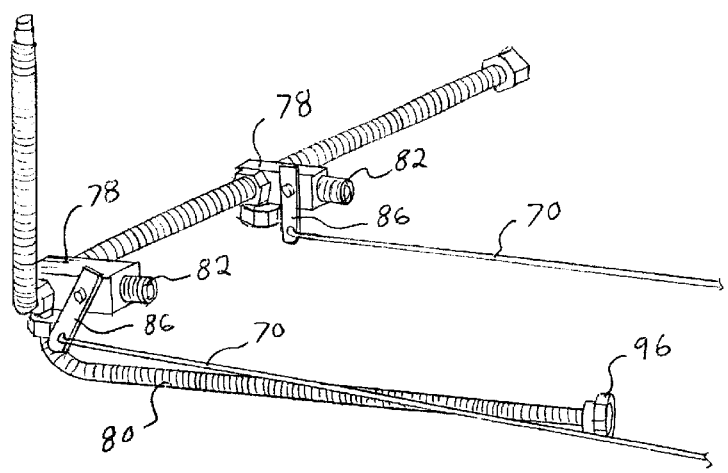
FIG. 12 is a view of the oil return system including the three port control valve.
Figure 13:
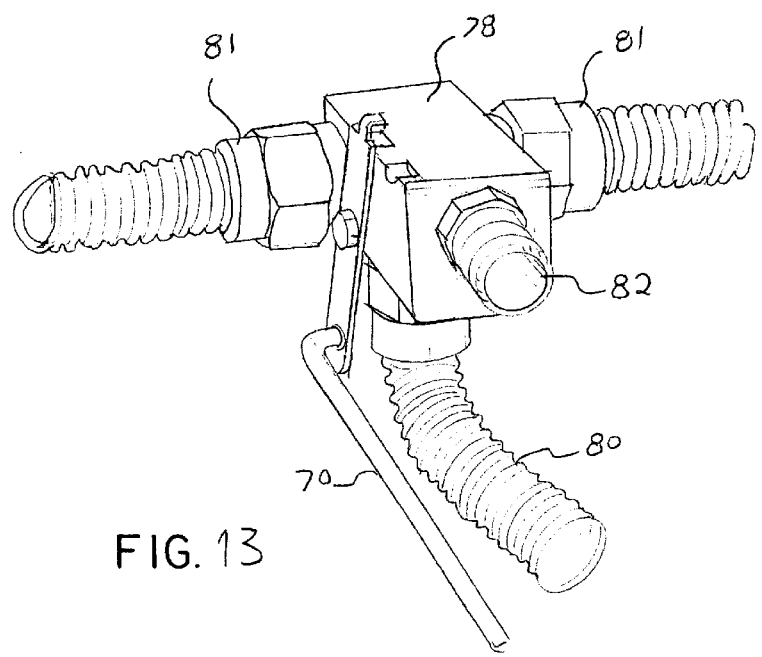
FIG. 13 is a fragmentary perspective view of the three port control valve.

With attention to FIGS. 9, 12, and 13, the control lever 32 is used to empty the tank. When lever 32 is actuated, oil will flow through discharge line 24 and downspout 26 into the filter pan 22.

Lever 70 serves two functions. Lever 70 activates a switch which turns the pump on and off, and at the same time it is connected to a three port valve 78 in the oil return line 80. Oil return line 80 is in communication with the pump outlet through coupling 84 and the outlet 82 from valve 78 is in communication with the fryer tank.

A separate three port valve 78 is provided for each fryer tank and as shown in FIGS. 1 and 2 there is a separate actuator handle 70 for actuating the appropriate valve 78.

When lever 32 is pulled to open the tank valve and send oil from the tank through line 24 and downspout 26 into the filter pan 22, the oil will accumulate in the pan 22.

When the pump is engaged by pulling handle 70, the appropriate three port valve 78 will also be open. With the pump engaged, oil will be drawn through line 30 and pumped through line 80. The oil from line 80 will pass through valve 78 and exit through line 82 to be reintroduced into the cooking tank. When the oil has been removed from the filter pan 22 lever 70 will be used to shut the pump off and simultaneously close valve 78. The lever arm 86 controls only the outlet 82 from the valve 78. Therefore, when outlet 82 is closed, and the pump is actuated, oil will flow through its valve 78 and outlets 81 into adjacent units. One or both outlets 81 could be capped if desired to stop the flow of oil therethrough. In addition, if the pump is actuated when its respective valve 78 is closed, it would be possible to pump oil from one filter pan to the adjacent tank unit.

Each fryer unit, then, could have its own filter pan, pump, drain, and recirculating system. In the preferred embodiment however, as shown in FIGS. 1–3, twin units are used with a common filter pan and drain system. One of the units has the downspout 26 with a common drain line 24 and a common flush outlet 66.

In this case, filtered oil is pumped from the common filter pan 22 through line 30 by the pump and circulated through one or both three port valves 78 each of which are controlled by the respective handle 70 so that the oil can be recirculated to the proper unit having its valve 78 open while the other valve 78 is closed. Each unit could have a mounting frame 83 which has an orifice 91 in which the flush outlet 66 can be mounted, and a second orifice 84 in which the pump inlet female block may be mounted.

The fryer units, then, may be adapted so that multiple units can be operated using a common pump and filter pan or each unit could have its own pump and filter pan. This invention also is not intended to be limited to a pair of units as shown in FIG. 1. Five and six units have been operated with a common pump using the system of this invention.

Figure 14:
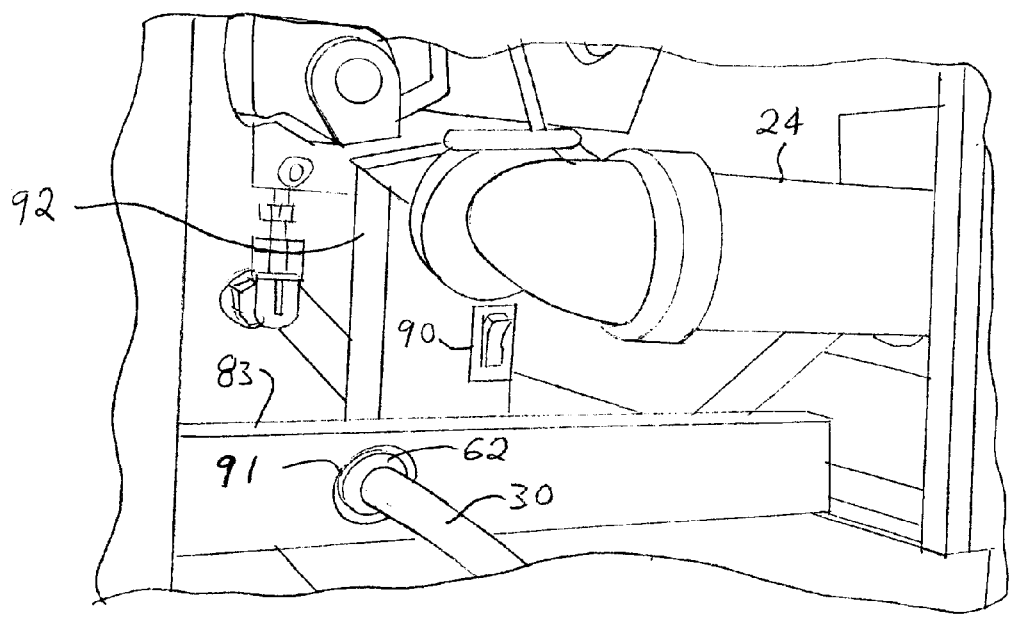
FIG. 14 is a fragmentary perspective view of a portion of the oil return showing the pump placement and the pump breaker switch.
Figure 15:
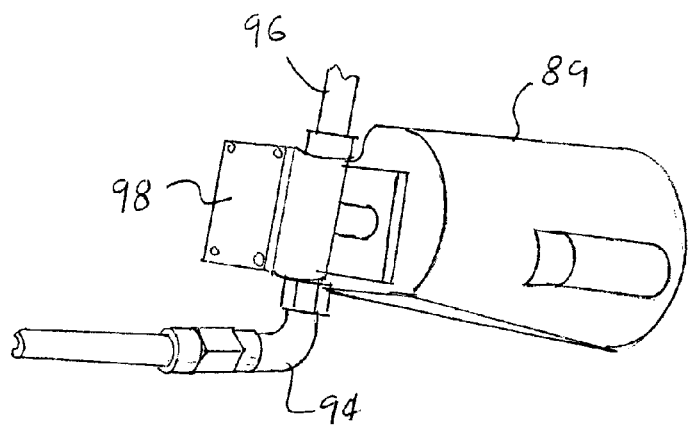
FIG. 15 is a perspective view of a pump showing the inlet and outlet.

With attention to FIGS. 14 and 15, a pump 89 is mounted behind a breaker box 92 which has a breaker switch 90. The pump 89 has an inlet pipe 94 which communicates through opening 81 in block 62 with the line 30. The pump then has an outlet 96 which communicates with the three port valve 78 through line 80. The pump is operated when handle 70 is pulled, opening valve 78, and a conventional Reed switch completes an electrical circuit concurrently.

As will be apparent to those skilled in the art, a single pump 89 then can be used with multiple units by appropriate opening and closing of three port valves 78 for each of the units. In this way, a single operator can be responsible for multiple cooking units and a single filter can service multiple units.

Concerning the filter pan itself, a handle 23 is provided on the front portion of the pan 22 and wheels are mounted on the rear portion (not shown). Typically metal feet (not shown) are provided on the lower portion of the front of the pan and the feet may be tapered in a bull nose to facilitate withdrawal from beneath the fryer assembly 42. The downspout 26 swivels to a substantially horizontal position so that the pan can be withdrawn from beneath the fryer assembly.

The guide rails 44 are tapered and incorporate a flange for the filter lid 46 as described above.

The drain line piping system 24 includes a universal joint (not shown) and elbows so that the line itself is of increasing diameter between the fryer tank and the downspout to avoid clogging. This then is a telescoping feature whereby multiple fryer configurations can be accommodated.

Finally, as noted above, the fryer of this invention can have the filter pan as an optional unit if desired because the presence or absence of the filter pan does not increase the outer envelope of the existing housing. If a customer desires to use a different type of filter the unit can be shipped without the filter pan and, if it is desired to add the filter system, it essentially can be added.

It will be readily seen by one of ordinary skill in the art that the present invention fulfills all of the objects set forth above. After reading the foregoing specification, one of ordinary skill will be able to effect various changes, substitutions or equivalents and various other aspects of the invention as broadly disclosed herein. It is therefore intended that the protection granted hereon be limited only by the definition contained in the appended claims and equivalents thereof.

We claim:

1. An oil filter system for at least one deep fat fryer, said fryer having a chassis, a tank for containing oil and heat means for heating the oil in said tank, said filter system comprising:

a drain for said tank, including a separately controlled outlet and a drain pipe in communication with said outlet, said drain pipe having a downspout;

a substantially rectangular, open filter pan disposed below said downspout and a substantially flat filter horizontally disposed within said pan below said downspout whereby oil to be filtered is directed by said downspout onto the upper surface of said filter said filter being vertically movable within said pan;

return means for withdrawing filtered oil from said pan and returning said oil to said tank including pump means and valve means for directing filtered oil from the filter pan to said tank;

said return means further including a take-up pipe having an end releasably coupled to said filter and an opposite end in communication with said pump and swivel mounting means carried by said pipe at said opposite end whereby when said end is uncoupled from said filter said pipe can be rotated away from said filter; and first switch means coupled to said pump means and valve means for simultaneously controlling said valve means and said pump means.

2. The system of claim 1 wherein a said downspout has a curved end for directing oil downwardly at an acute angle to said filter and rotatable mounting means whereby said downspout can be rotated between a first horizontal position to a second angled position.

3. The system of claim 1 wherein the valve means includes a valve having one inlet and three outlets, one of said outlets being coupled to said first switch means.

4. The system of claim 3 wherein the valve communicates with said tank through the outlet coupled to said first switch means.

5. The system of claim 1 further comprising second switch means coupled to the outlet of said tank for opening and closing said outlet.

6. The system of claim 5 wherein said first and second switch means each includes a manual actuator handle.

7. The system of claim 1 wherein said filter pan is movable horizontally.

8. The system of claim 1 wherein said horizontal filter includes a metal frame and a porous sleeve surrounding said frame said sleeve having a central port extending vertically though the upper surface only and a pipe coupled to said frame extending through said port for drawing filtered oil from within said sleeve on said filter and into said return means.

9. The system of claim 8 wherein said filter frame includes a pair of opposed handles extending upwardly therefrom.

10. The system of claim 1 wherein at least two fryer tanks are provided with a common filter pan and pump.

11. The system of claim 10 further comprising flush means coupled to said return means for flushing said tank with filtered oil.

12. The system of claim 8 wherein said coupling includes a sealing flange adapted to engage the periphery of the central port in said sleeve.

13. The system of claim 1 wherein said return means includes only one pump.

14. The system of claim 1 wherein said return means includes a plurality of pumps.

15. The system of claim 7 wherein at least one pair of wheels is mounted on the bottom of said pan.

16. The system of claim 1 further comprising a filter pan lid slidabley horizontally relative to said chassis.

17. The system of claim 9 wherein said frame includes a flat porous metal sheet disposed within said sleeve, and said pipe coupling is centrally mounted on said mesh extending upwardly therefrom.

* * * * *